United States Patent

Buffa et al.

[11] 3,861,293
[45] Jan. 21, 1975

[54] APPARATUS FOR MAKING FOODS AND FEEDS

[75] Inventors: Aldo Buffa, Paris, France; Adolf Holliger, Uzwil, Switzerland

[73] Assignee: Unicef, Aldo Buffa and Gebruder Buehler AG, Uzwil, Switzerland

[22] Filed: Oct. 16, 1972

[21] Appl. No.: 297,645

Related U.S. Application Data

[62] Division of Ser. No. 149,712, June 3, 1971, abandoned.

[30] Foreign Application Priority Data

June 5, 1970 Great Britain ............ 27431/70

[52] U.S. Cl. .................................. 99/484, 426/20
[51] Int. Cl. ........................................... A23k 1/10
[58] Field of Search .......... 425/376, 377, 378, 379, 425/382; 195/31, 143; 99/483, 484, 536, 645, 467; 426/18, 20

[56] References Cited
UNITED STATES PATENTS

| | | | |
|---|---|---|---|
| 1,155,977 | 10/1915 | Vernon ............................ | 99/536 X |
| 2,325,368 | 7/1943 | Christensen ..................... | 195/143 X |
| 2,555,235 | 5/1951 | Huzenlaub et al. .............. | 426/18 |
| 2,556,247 | 6/1951 | Zeigler et al. ................... | 425/377 |
| 2,614,935 | 10/1952 | Dienst et al. .................... | 99/536 X |
| 2,905,109 | 9/1959 | Schrenk .......................... | 425/377 |
| 3,172,766 | 3/1965 | Lareybeyrette ................. | 426/18 |

*Primary Examiner*—Robert L. Bleutge
*Assistant Examiner*—Arthur O. Henderson
*Attorney, Agent, or Firm*—Toren and McGeady

[57] ABSTRACT

Apparatus for making foods and animal feeds from starchy raw materials, such as flour, meal and grits of cereals, pulses, starch roots, tubers, oil seeds, cakes of oil seeds, milk products, or mixtures of these materials, which includes: mixing water and at least one high-temperature resistant enzyme with the raw materials to form an extrudable paste; effecting partial gelatinization and initiating fermentation by extruding the paste while heating the paste to a temperature of from 65°C (149°F) to 115°C (239°F); converting the starch into dextrins and sugars by treating the extruded product in a fermentation apparatus for 40 to 90 minutes at a temperature of 55°C (131°F) to 90°C (194°F) in a high humidity atmosphere, as near as possible to saturation; and drying the product after fermentation.

The finished product comprises from about 11 to 24 weight per cent of proteins, from about 4 to about 10 weight percent of water, from 45 to 70 weight per cent of carbohydrates, from about 7 to 37 weight per cent of sucrose, from 0 to 2.8 weight per cent of ash, from 0 to 5 weight per cent of crude fiber, from 0 to 10.0 weight per cent of crude fat and has a pH value of around 6.5 to about 7.

Apparatus includes an extruder and a continuous drier apparatus, with a fermentation apparatus arranged continuously to receive the shaped products from the extruder and continuously to deliver them to the continuous drier apparatus.

10 Claims, 4 Drawing Figures

APPARATUS FOR MAKING FOODS AND FEEDS

This is a divisional application of application Ser. No. 149,712 filed June 3, 1971 now abandoned.

BACKGROUND INFORMATION AND PRIOR ART

This invention relates to apparatus for making foods and feeds out of raw material such as flour, meal and grits of cereals, pulses, starch roots, tubers, oil seeds, cakes of oil seeds, milk products and mixtures of these materials.

Starting with these raw materials it is possible to obtain foods or feeds having a high nutritive value and good protein contents. The essential aminoacids in the resulting products are sufficient, or at least it is not necessary to supplement them in too large a measure.

As these raw materials are generally obtainable locally, even in countries where there is a problem of insufficient nutrition, and as their price is not too high on the average, the resulting products are particularly useful in developing countries. No limitation of utilization in any particular country is to be construed from this statement, as it will be shown below that products obtained can fulfill as high a standard of quality as may be set reasonably in any country.

Apparatus for making foods and feeds from the above-mentioned raw materials already exists which uses a plant similar to that utilized generally for the production of short-cut macaroni products. Between the extrusion press and the continuous belt driers a continuous immersion device and a continuous cooking apparatus have been provided. When the process is used in the manufacture of weaning flours, the raw materials are mixed, extruded, showered with water, cooked for about 5 – 10 minutes by means of steam, and then dried to 6 – 8 percent water contents. Owing to the cooking step, the drying time is only about 2 hours, for example, much less than for conventional macaroni products. The dried product is then comminuted to a flour and stored in storage elements. Before packaging, the product is extracted from the storage elements and mixed with suitable complements, such as aminoacids, vitamins, mineral salts, concentrated proteins, sugar and aromas. It is also possible to add raw sugar, yeast, milk powder at the mixing stage, obtaining thereby a sterilization of these materials. On the other hand, if the supplemental products are added before packaging, the capacity of the manufacturing line is higher and the vitamins and aminoacids do not undergo a degradation. The chief advantage of the above-outlined process is due to the fact that it is possible to provide alternate equipment between the press and the drier, for example, a conventional pre-drier with vibrating conveyors, such as is in extensive use throughout the world for the manufacture of short-cut macaroni products. When the plant is not in use for the production of weaning flour, it is used for the manufacture of conventional short-cut macaroni products.

Considering further the production of weaning flours, another development has been based on the following considerations: The major food of the world is starch, for those foods which form the mainstay of human diet are all rich in starch. But starch is too difficult to digest for the stomach of children at weaning (6 months to 2 years).

As is well known, the first step in the hydrolysis of starch is the formation of dextrins. This reaction leads to a series of polymer fragments of varying molecular size. Dextrins are a mixture of soluble compounds formed by the partial breakdown of starch.

One of the most important intermediate stages during the breakdown of starch to glucose is maltose. It has 33 percent of the sweetness of sucrose and is formed by two molecules of glucose.

Glucose (or dextrose) is the major product of the digestion of carbohydrates in the intestines and is the form in which the carbohydrate is absorbed into the bloodstream. It is less sweet than sucrose (74 percent of the sweetness of sucrose).

With these considerations in mind, the flours of cereals and the like have been mixed with water and heat-resistant $\alpha$-amylase. These have then been preheated in a steam-jacketed agitating tank, dried over a double rotating drum-drier and packaged after blending with supplemental products similar to those of the preceding example. Because of the enzymatic conversion of starch into dextrins and sugars, the digestibility coefficient of the product reached very high levels and its organoleptic characteristics were much improved. Before packaging it, much less sugar must be added. The viscosity of this product was very low, making it possible for children to absorb the flour without an unduly high addition of water. A disadvantage resided in the relatively high costs of the manufacturing plant which furthermore cannot readily be used for other types of production. As the working temperature must be relatively high, namely 140°C (284°F) or at least 130°C (266°F) for obtaining a sufficient throughput, some essential aminoacids, particularly lysine, are destroyed. Furthermore, the caloric consumption is much higher: 2.6 to 4 kg heating steam per kg of finished product is needed, against 1 kg heating steam per kg of finished product in the case of the process carried out with the macaroni manufacturing line.

SUMMARY OF THE INVENTION

According to the present invention there is provided apparatus for making foods and animal feeds out of raw materials, such as flour, meal and grits of cereals, pulses (the edible seeds of various leguminous crops) starch roots, tubers, oil seeds, cakes of oil seeds, milk products including whey, or mixtures from these materials, which includes the steps of: mixing water and at least one high-temperature resistant starch hydrolyzing enzyme with the raw materials to form an extrudable paste, in which the moisture content of the said initial mix is from about 30 percent to around 50 percent of the total weight; obtaining a partial gelatinization and initiating fermentation by extruding said paste in an extruding apparatus heated to bring this paste to a temperature of from about 65°C (149°F) to about 115°C (239°F); converting the starch into dextrins and sugars by treating the extruded product in a fermentation apparatus for about 40 to around 90 minutes at a temperature of about 55°C (131°F) to around 90°C (194°F) in a high humidity atmosphere, as near as possible to saturation; and drying the product after fermentation.

Under these conditions as much water as possible is used as makes it still possible to obtain an extrudable paste. This relative high water content favors the hydration and conversion of starch. Heating the paste in the extruding apparatus ensures that the fermentation will start as the product is malaxed and the starch structure is pregelatinized, facilitating thereby the penetration and action of the enzymes, in such a manner that the following fermentation phase brings about the desired conversion of starch into dextrins and sugars.

In particular, by preferred embodiments of the process as herein described, several further improvements may be obtained: Sterilization of the products can be obtained by heating during the drying step for a period of about 60 to about 180 minutes at about 85°C (185°F) to about 100°C (212°F). Preferably the drying step is continued until the moisture content of the product has been reduced to about 4 – 10 percent.

The enzymes may be de-activated by a preliminary drying stage at about 95°C (203°F) to about 100°C (212°F) for about 10 to about 20 minutes.

The fementation step may be improved by adding water and/or steam to the product either before or while it is in the fermentation apparatus.

The pH value of the mixture may be regulated by additives added before the extrusion stage, preferable in the mixer, which may be heated.

The process, if used to manufacture dietetic products, can be pursued until a predetermined content of dextrin and reducing sugars is obtained. In the case of baby foods and weaning flours, the fermentation can be continued until a dextrin content of at least 25 percent (preferably 50 percent) and a content of reducing sugars of at least 15 percent of the initial starch content is obtained, after which the product is dried, comminuted to a flour and mixed with additional ingredients to render a product of low viscosity and high solubility. Acceptability and tolerance and nutrition tests for infants' diets were successful: No vomiting, flatulence, abdominal pain or lack of desire to take the food mixture. Also, the acceptance of the product was more universal in the sense that children accepted products made of raw materials for which they were not atavistically prepared. As an example, a product based on a mixture of North African raw materials, such as hard wheat (durum) flour, chick pea flour, lentil flour, was accepted without difficulty by Central American children.

To increase the effective amount of reducing sugars, hydrolysis of the starch may be effected with a two enzyme process at least one of which is a high-temperature resistant α-amylase (enzyme-enzyme-conversion) until a predetermined content of dextrin and reducing sugar, especially mono- and disaccharides, is obtained.

Although the present apparatus is designed mainly for the manufacture of weaning flours, it may be used to make other products based on these raw materials. While it may be technologically advisable to use very high temperatures, limiting factors, such as stoppage of enzymatic activity and degradation of aminoacids have to be kept in mind in particular applications thereof.

According to a further aspect of the invention, there is provided an apparatus described above which includes an extruder and a continuous drier apparatus together with a fermentation apparatus arranged continuously to receive the shaped products from the extruder and to continuously deliver them to the continuous drier apparatus.

In a preferred embodiment, the fermentation apparatus comprises a converter with a closed vessel and a continuous conveyor therein, this conveyor consisting of a succession of belt conveyors disposed one above the other. This fermentation apparatus is particularly well adapted for the treatment of solid products.

Further improvements can be provided, such as a steam injector discharging into the vessel, and/or a water injector or water spraying device, discharging onto one or several of said superimposed belt conveyors.

A water spray and/or steam injectors can be adapted to discharge on the shaped products between the extruder and the vessel.

Heating means and blower means can be provided in the vessel for heating and circulating the high humidity atmosphere contained in said vessel.

For the purpose of cleaning and disinfecting the vessel, continuous conveyors and driers, means for blowing gases and/or vaporized products can be provided.

The invention also resides in a novel food product prepared as described above.

Additional features and advantages of the invention will be more readily apparent from a consideration of the following non-limiting description thereof, particularly when taken together with the accompanying drawings, wherein: conveyed FIG. 1 is a diagrammatic illustration of the apparatus used in the process of the invention;

Figure 1:
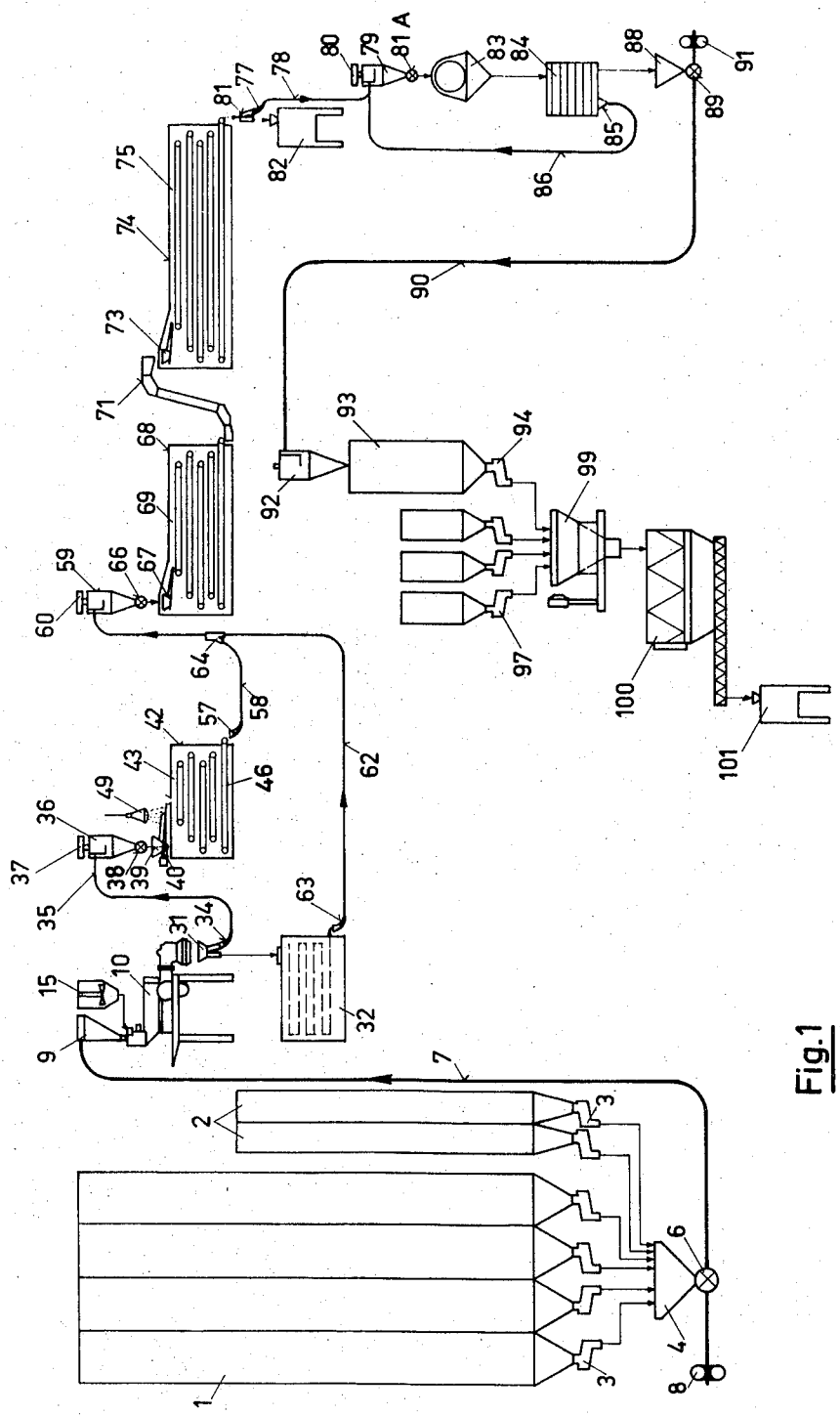

With reference to FIG. 1, silo cells 1 for the diverse raw materials and cells 2 for additives are provided with measuring-extracting or dispensing devices 3 of known construction. The actual number of cells 1 and 2 may, of course, be greater than represented.

Figure 2:
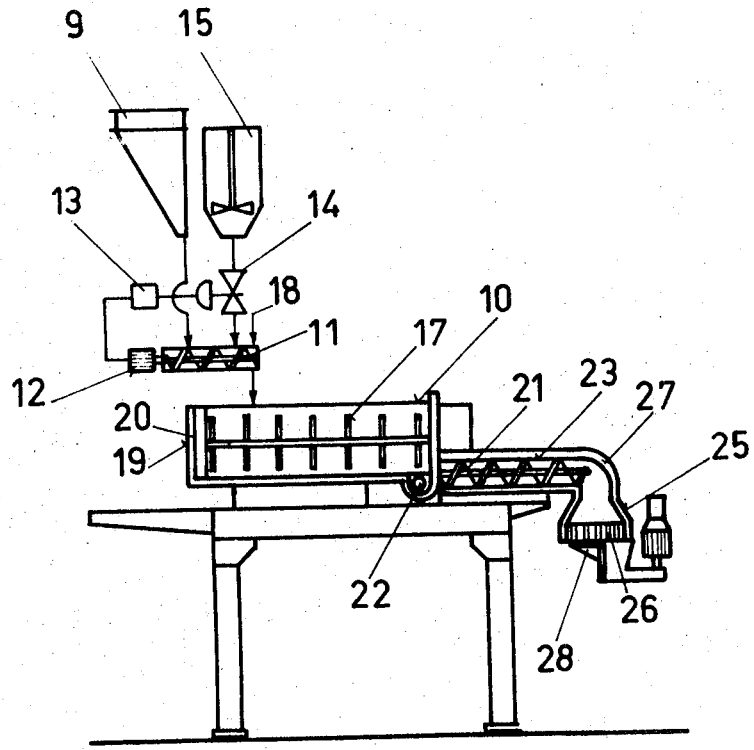
FIG. 2 shows the extruding apparatus of FIG. 1 in longitudinal section.

The extracting devices 3 discharge into a hopper 4 and through an airlock 6 into a pneumatic conveyor 7 with a pressure blower 8. The pneumatic conveyor 7 leads the resulting mixture of raw materials to a pneumatic separator 9 over the extrusion press 10 which is substantially of the type used in the manufacture of short-cut macaroni products. The raw materials separated from the conveying air discharge into a continuously working measuring worm-conveyor 11 (FIG. 2) with a geared motor 12 connected to a regulator 13. The regulator 13 is connected to an adjustable valve 14 for regulating the flow through this valve in accordance with the speed of the worm-conveyor 11. The valve 14 leads from a blending vessel 15, where the enzymes are pre-mixed with the water, which will be added to the raw materials, to the worm-conveyor 11, which discharge into the continuous mixer 17 of the extruding press 10. Further inlet means 18 are provided for introducing additives into the mixer 17. The walls 19 of the mixer 17 are provided with passages 20 for a heating fluid. Between the mixer 17 and an extruder 21 of the press 10 is provided a transversely disposed worm conveyor 22 of known construction with a usual vacuum device (not represented) for degassing the paste. Walls 23 of the extruder 21 and of a holderhead 25 for a perforated die plate 26 are provided with passages 27 for a heating fluid. Under the die plate 26, a cutting device 28 of the usual type for obtaining short-cut paste products is provided.

Figure 3:
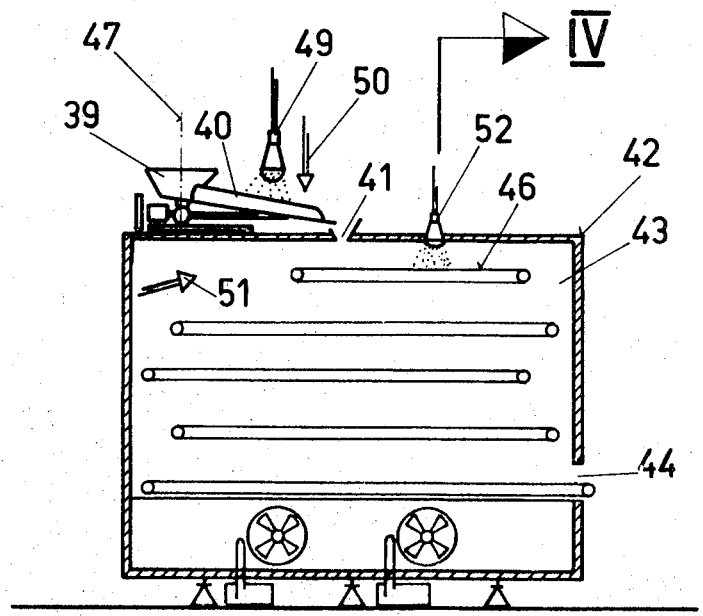
FIG. 3 shows the converter of FIG. 2 in longitudinal section.
Figure 4:
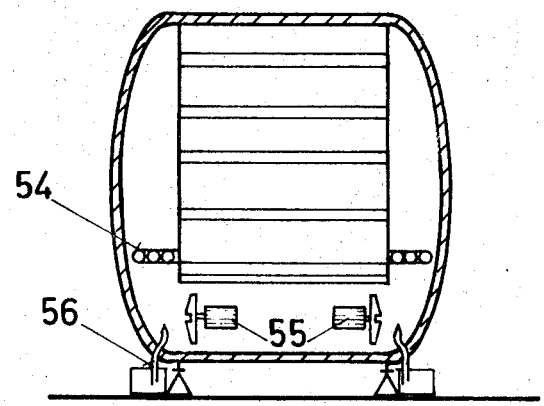
FIG. 4 is a section through line IV—IV of FIG. 3.

By means of a switch 31, the extruded products may be directed either to a conventional pre-drier 32 (FIG. 1) equipped with vibrating conveyors (not shown), for the manufacture of short-cut macaroni products, or to an inlet 34 of a pneumatic conveyor 35 and to a pneumatic separator 36 with a suction blower 37. The separator 36 discharges through an air-lock 38 into a feed hopper 39 of a shaker conveyor 40 which discharges through an opening 41 into the substantially closed vessel 42 of a converter 43 (FIG. 3) in which fermentation takes place, the only other opening in the vessel 42 being the exit 44. A conveyor consisting of a succession of belt conveyors 46 disposed one above the other runs in the vessel 42. The belts may be of a continuous or of an articulated type. As the belt conveyors 46 are much wider than the shaker conveyor 40, this shaker conveyor 40 has a further component of movement swinging to and fro about the vertical axis 47 of its feed hopper 39. For this reason, the opening 41, as would be seen in a plan view, is of arcuate shape. On the shaker conveyor 40 is mounted a water shower 49 and a steam injector 50 (FIG. 3). A steam injector 51 is disposed in the vessel 42 discharging into the vessel while a water shower 52 discharges onto the first of the belt conveyors 46. Heating means 54 (FIG. 4) and blower means 55 in the vessel 42 circulate high humidity air in said vessel 42. A device 56 for blowing gases and/or vaporized products for the purpose of sanitation and disinfection is disposed in the vessel 42.

From the lowest of the belt conveyors 46 the product falls onto the inlet 57 (FIG. 1) of a pneumatic conveyor 58 and is carried to a pneumatic separator 59 on which is provided a suction blower 60. Instead of the pneumatic conveyor 58, a pneumatic conveyor 62 with an inlet 63 adapted to receive the short-cut macaroni in the pre-drier 32 may be connected over a switch 64 to the pneumatic separator 59.

The pneumatic separator 59 discharges through an air lock 66 onto a distributor 67 of similar construction as the shaker conveyor 40. This distributor 67 is disposed in a first-stage drier 68 with a succession of belt conveyors 69 disposed one above the other. From the lowest belt conveyor 69 the product falls into a bucket elevator 71 leading to a distributor 73 in a second-stage (or finishing) drier 74, which has a succession of belt conveyors 75 disposed one above the other. From the lowest of the belt conveyors 75, the product falls into the inlet 77 of a pneumatic conveyor 78 leading to a pneumatic separator 79 with a suction blower 80. A switch 81 can direct flow to a packaging machine 82 instead of into the inlet 77. The separator 79 discharges over an air lock 81A into an impact comminuting mill 83. The product falls into a classifier 84. The rejects from the classifier 84 fall into the inlet 85 of a pneumatic conveyor 86 returning to the pneumatic separator 79. The comminuted product or flour, having passed through the sieves of the classifier 84, falls into a hopper 88 and through the airlock 89 of a pneumatic conveyor 90 with a pressure blower 91. The pneumatic conveyor leads to a pneumatic separator 92 which discharge into a storage bin 93 (or a group of storage elements) provided with an extractor 94 of known construction. Further bins with extractors 97 are provided to supplement materials. The extractors 97 feed into blending scales 99 which discharge into a batch mixer 100 which feeds a package filling machine 101.

The invention will now be described by several examples, it being understood, however, that these examples are given by way of illustration and not by way of limitation and that many changes may be effected without affecting in any way the scope and spirit of the invention as recited in the appended claims.

EXAMPLE 1

The measuring extracting devices 3 are set to produce a mixture consisting of 30 percent hard wheat flour, 40 percent chick pea flour, 15 percent lentil flour, 8 percent skim milk, 6 percent sucrose and 1 percent additives. These additives consist of a pre-mix of vitamins, aromas, salts of calcium, phosphorus, iron and of aminoacids. The pneumatic conveyor 7 carries this mixture to the pneumatic separator 9 which discharges it onto the measuring worm-conveyor 11. The geared motor 12 of this measuring worm-conveyor 11, acting through regulator 13, sets the valve 14 so as to add water for obtaining a moisture content of 32 percent of the total weight of the initial mixture. In the blending vessel 15 a quantity of $\alpha$-amylase has been added to the water so as to obtain an $\alpha$-amylase content of 0.04 percent of the total weight.

These $\alpha$-amylase enzymes are chosen from the GRAS ("generally recognized as safe") list of the Food and Drug Administration (FDA). As non-limiting examples of suitable enzymes for the purpose of the invention, the following may be cited:

BDE 2000—$\alpha$-amylase from "Societe Rapidase," Seclin, France (used in this Example 1)

HT 1000—$\alpha$-amylase from Miles Chemicals Co., Elkhart, Ind., USA

DIASMEN—$\alpha$-amylase from Daiwa Kasei K. K. Osaka, Japan.

The initial mix is continuously discharged by the worm-conveyor 11 into the mixer 17, where the pH is regulated to 6.5 by adding small quantities of additives, such as citric acid or tartaric acid. The continuous mixer 17 is set so that the average dwelling time is 15 minutes. The paste produced in the mixer 17 is then conveed by worm-conveyor 22 in a vacuum atmosphere which helps in breaking up the starch structure then into the extruder 21 where it reaches a temperature of 70°C (158°F) in the course of a through-put time of 3 minutes. As a result of vigorous working-up and of the high temperature, the starch structure is partly broken down, and a good effect from the $\alpha$-amylase is obtained, resulting in a priming of fermentation. A partial gelatinization of the starch is also obtained.

The product extruded through the die plate 26 is cut by cutting device 28 and is conveyed continuously by pneumatic conveyor 35 and shaker conveyor 40 to the highest belt conveyors 46 in the substantially closed vessel 42 of the converter 43. The speed of the belt conveyors 46 is set to obtain a through-put time of 40 minutes in an atmosphere having a relative humidity of 97 percent at a temperature of from 55°C (131°F) to 65°C (149°F). In this manner, 25 percent of the initial starch contents are converted into dextrins and 15 percent into reducing sugars (such as maltose).

The product is continuously conveyed from the lowest of the belt conveyors 46 by pneumatic conveyor 58 to the distributor 67 into the first-stage drier 68 where the through-put time is 20 minutes in an atmosphere of 80 percent relative humidity and a temperature of 95°C (203°F), whereby the enzyme is inactivated. The product is then conveyed from the first stage drier 68 by bucket-elevator 71 to distributor 73 into the second stage drier 74 where the through-put time is 180 minutes in an atmosphere of 30 percent relative humidity at a temperature of 95°C (203°F), thereby sterilizing the product and drying it to a total moisture content of approximately 5 percent to 8 percent of its total weight.

From the second stage drier 74 the product is continuously conveyed by pneumatic conveyor 78 to impact mill 83 and the flour issuing from the classifier 84 is conveyed continuously by the pneumatic conveyor 90 to storage element 93 where it will remain until needed. It is then discharged by extractor 94 into mixing scales 99 where it will be blended with supplemental products, such as sugar, protein-concentrate, dry powdered milk and mixes of vitamins, aminoacids and mineral salts from the storage elements 96. The blended products are mixed in the batch mixer 100 and then packaged in the package filling machine 101.

The analysis of the product in storage element 93 is as follows: Approximately 5 to 8 percent water; 20 percent proteins; 55 to 58 percent carbohydrates (starch or starch derivatives) including 15 percent of the whole product of dextrins and 10 percent reducing sugars, such as maltose; 7 percent sucrose (that is a little more than initially); 2.8 percent ash; 1 percent crude fiber; 3.8 percent crude fat. The pH value is 6.5.

When the plant is used for manufacturing conventional short-cut macaroni products, the switches 31 and 64 are changed-over to lead the products from the press 10 to the pre-drier 32 and from the pre-drier 32 into pneumatic conveyor 62 to the first stage drier 68. Likewise, the switch 81 is changed over to lead the dried products from the second stage drier 74 to the packaging machine 82. Of course, the through-put, the temperatures, air-humidities and through-put times of the plant are changed to values suitable for this type of production.

The further examples will be given in the form of formulas, as the the function of the plant is substantially the same as in Example 1.

EXAMPLE 2

A mixture is made from the following: 35 percent maize grits; 40 percent split peas; 12 percent defatted sunflower flour; 11 percent sugar (sucrose); and 2 percent additives (same components as in Example 1).

Water is added to obtain a moisture content of 50 percent of the total weight, as well as 0.1 percent of the total weight of a high-temperature resistant $\alpha$-amylase. In this case, the HT 1,000 $\alpha$-amylase is used. The pH value is about 7 and need not be regulated by additives.

After mixing for 15 minutes, the through-put time through the extruder 21 is 1.5 minutes and a paste temperature of 100°C (212°F) is reached.

Fermentation time: 60 minutes in an atmosphere with humidity of 100 percent and a temperature of 75°C (167°F). 35 percent of the initial starch contents are converted into dextrins and 18 percent into reducing sugars (such as maltose and glucose).

Inactivation of the enzymes takes place during 10 minutes in an atmosphere of 90 percent humidity at a temperature of 100°C (212°F).

Sterilization of the product is effected during 60 minutes in an atmosphere of 50 percent relative humidity and a temperature of 100°C (212°F). Final drying takes place during 120 minutes in an atmosphere of 55 percent relative humidity and a temperature of 60°C (140°F).

The partial analysis of the product obtained is: 6 to 7 percent water; 23.5 percent proteins; 50 percent carbohydrates (starch or starch derivatives) including 16 percent dextrins and 8.2 percent reducing sugars, such as maltose and glucose; and 12 percent sucrose. The pH value is 7.

EXAMPLE 3

10 percent Wheat semolina; 10 percent barley flour; 10 percent oat flour; 6 percent potato flour (or tapioca flour); 10 percent oil-extracted soya grits; 15 percent whole dry milk; 37 percent sugar (sucrose); and 2 percent additives (same as in Example 1).

Water is added to obtain a moisture content of 40 percent of the total weight as well as 0.05 percent of the total weight of a high-temperature resistant $\alpha$-amylase. In this case HT 1,000 $\alpha$-amylase is added in connection with a glucoamylase enzyme, e.g. 0.35 percent of DIAZYME L-30 glucoamylase. DIAZYME L-30 is a product of Miles Laboratories which is generally of the form 3.2.1.3$\alpha$ - 1.4 glucan-glucohydrolase. The pH is regulated at 5.5 in the same manner as in Example 1.

After 15 minutes mixing, the extrusion is made with a through-put time of substantially less than 1 minute, the paste reaching a temperature of 105°C (221°F).

Addition of water by sprayer 49 brings the moisture content to 50 percent of the total weight.

Fermentation takes place for 30 minutes at a relative humidity of 100 percent and an air temperature of 65°C (149°F) to 75°C (177°F).

According to pre-determination, 40 to 60 percent of the initial starch contents are converted into dextrins and into reducing sugars, such as maltose. After further 30 minutes, 50 to 80 percent of dextrins and maltose are converted into glucose.

A special step for inactivating the enzyme is not necessary. Sterilization takes place for 120 minutes at a relative humidity of 70 percent and an air temperature of 93°C (199.4°F).

Final drying requires 180 minutes at a relative humidity of 30 percent and air temperatures of 75°C (167°F) to 80°C (176°F). Analysis of the product obtained gives the following results:

4 to 5 percent water; 11.5 percent proteins; 45 percent carbohydrates (starch or starch derivatives) including 6 to 12 percent dextrins and maltose and 25 to 33 percent glucose; and 37 percent sucrose (this is as originally added). The pH value is 6.5.

While the foregoing has stressed the preparation of products designed for human consumption, it is evident that these products can also be used as animal feeds.

The apparatus herein described makes it possible to obtain an improvement in the quality of products made by the enzymatic conversion of starch in a manufacturing plant of the type commonly used for the manufacture of short-cut macaroni products. Hitherto the main difficulty was to reconcile the generally high temperature and humidity contents necessary for enzymatic conversion of starch, on the one hand, with the possibility of extruding, for example, a relatively high viscosity of the initial mixture allowing the formation of a paste, on the other hand. Furthermore, it was unexpected that fermentation could take place in the extruded product, for example, in a solid stage, instead of in a liquid state as in the prior art.

What is claimed is:

1. Food making apparatus comprising, in combination, mixing means for mixing solid starchy raw materials with an aqueous solution containing enzymes; heating means for heating said mixing means; extruding means communicating with said mixing means for forming a shaped food product; pre-drying means receiving said product; conveying means for conveying the pre-dried product; a fermentation apparatus receiving said product from said conveying means, said fermentation apparatus comprising a substantially closed vessel and a continuous conveyor therein consisting of a succession of belt conveyors superimposed one above the other, heating means and air circulating means for circulating high humidity air in said vessel; at least one drying unit including conveying means therein receiving said product and drying the same; and comminuting means receiving said dried product.

2. Food making apparatus comprising in combination:

a mixer, means for introducing solid starchy raw materials and an aqueous enzyme-containing solution into said mixer, said mixer arranged to mix the raw material and aqueous enzyme-containing solution and to form the mixture into a paste, means for heating said mixture, an extruder including a die plate arranged to receive the mixture directly from said mixer and to extrude it through said die plate, fermentation means arranged to receive a supply of the extruded paste material, said fermentation means including a substantially closed vessel having an inlet and an outlet, means for heating the interior of said vessel and conveying means for passing the extruded material from the inlet to the outlet of said vessel, drying means for the paste material and means for conveying the paste material from the outlet of said closed vessel to said drying means.

3. Apparatus as claimed in claim 2, wherein the inlet to said closed vessel is located above the outlet, and said conveying means in said closed vessel comprises a succession of generally horizontally arranged vertically spaced belt conveyers arranged to transport the paste material from the inlet to the outlet.

4. Apparatus as claimed in claim 3, comprising a steam injecting device discharging into said vessel.

5. Apparatus as claimed in claim 3, comprising a water spraying device, discharging onto at least one of said superposed belt conveyors.

6. Apparatus as claimed in claim 3, comprising a water shower and/a steam injector, adapted to discharge on the food between the extruding means and the vessel.

7. Apparatus as claimed in claim 3, wherein said means for heating the interior of said vessel comprises heaters and blower means located in said vessel for heating and circulating the high humidity atmosphere in said vessel.

8. Apparatus as claimed in claim 7, comprising a device to diffuse gases and/or vaporized products for the purpose of sanitation and infestation control of the vessel, conveyors and drying means.

9. Food making apparatus comprising in combination:

mixing means for mixing solid starchy raw materials with an aqueous enzyme containing solution comprising a worm conveyor arranged to work continuously and to measure materials conveyed, a geared motor connected to said worm conveyor, a regulator connected to said geared motor, said worm conveyor having a first inlet for the raw materials, a second inlet for the aqueous solution, and an outlet, a line for supplying the aqueous solution to the second inlet, a valve in said line connected to said regulator for regulating the flow of the aqueous solution into the conveyor, an extruding press connected to the outlet from said worm conveyor, said extruding press including a continuous mixer arranged to receive the mixed raw materials and aqueous solution from said worm conveyor, and for moving the mixture through the mixer, a second worm conveyor extending transversely of said mixer and located at the downstream end of said mixer from the point at which the mixture is received from said worm conveyor and arranged for degassing the material exiting from the downstream end of the mixer, a die plate arranged downstream from the second worm conveyor, wall means forming a passageway from said second worm conveyor to said die plate and said wall means having passages therein for a heating fluid, a cutting device associated with said die plate, a fermentation apparatus arranged to receive the extruded paste material, said fermentation apparatus comprising a substantially closed vessel having an inlet in the upper part thereof and an outlet in the lower part spaced below the inlet, conveying means within said closed vessel for transporting the extruded paste material from the inlet to the outlet, said conveying means comprising a plurality of horizontally arranged vertically spaced belt conveyors with the lowermost one of said belt conveyors arranged to deliver the extruded paste material to the outlet of said closed vessel, blowers in said closed vessel below the lowermost said belt conveyor and arranged to circulate high humidity air in said closed vessel, steam injectors arranged to discharge into said closed vessel, a water shower arranged to discharge water onto the uppermost one of said belt conveyors in said closed vessel, dryer means arranged to receive the extruded paste material from said fermentation apparatus, said dryer means comprising a first stage dryer arranged to receive the material from said fermentation apparatus and a second stage dryer arranged to receive the material from said first stage dryer, and each of said first and second stage dryers having a plurality of horizontally arranged vertically spaced conveyors arranged to effect a downward flow path of the material through the dryer.

10. Food-making apparatus, as set forth in claim 2, wherein said means for introducing raw materials and the aqueous enzyme-containing solution into said mixture comprises a device forming a chamber and including a first inlet for introducing the raw materials into the chamber, a second inlet for introducing the aqueous enzyme-containing solution into the chamber, an outlet from the chamber for the mixture of the raw material and aqueous solution, and means within said device for mixing and conveying the mixture of the raw material and aqueous solution to the outlet.

* * * * *